(12) United States Patent
Lan et al.

(10) Patent No.: US 11,254,032 B2
(45) Date of Patent: Feb. 22, 2022

(54) SURFACE TEXTURING FOR ADVANCED POLYMERS

(71) Applicant: ATSP Innovations, Inc., Champaign, IL (US)

(72) Inventors: Pixiang Lan, Urbana, IL (US); Andreas A. Polycarpou, College Station, TX (US); Jacob Meyer, Urbana, IL (US)

(73) Assignee: ATSP Innovations, Inc., Houston, TX (US)

( * ) Notice: Subject to any disclaimer, the term of this patent is extended or adjusted under 35 U.S.C. 154(b) by 0 days.

(21) Appl. No.: 16/677,295

(22) Filed: Nov. 7, 2019

(65) Prior Publication Data

US 2020/0147840 A1 May 14, 2020

Related U.S. Application Data

(60) Provisional application No. 62/757,256, filed on Nov. 8, 2018.

(51) Int. Cl.
| | |
|---|---|
| *B29C 39/26* | (2006.01) |
| *B29C 33/38* | (2006.01) |
| *B29C 33/42* | (2006.01) |
| *C08K 3/04* | (2006.01) |
| *C08L 27/18* | (2006.01) |

(Continued)

(52) U.S. Cl.
CPC .............. *B29C 39/26* (2013.01); *B29C 33/38* (2013.01); *B29C 33/424* (2013.01); *B29C 39/003* (2013.01); *B29C 39/38* (2013.01); *C08K 3/041* (2017.05); *C08K 3/042* (2017.05); *C08K 3/046* (2017.05); *C08K 3/11* (2018.01); *C08L 27/18* (2013.01); *B29C 2059/023* (2013.01);

(Continued)

(58) Field of Classification Search
CPC ... G03F 7/70416; G03F 7/0037; B33Y 10/00; B33Y 30/00; B29C 64/245; B29C 64/241; B29C 64/135; B29C 64/268
See application file for complete search history.

(56) References Cited

U.S. PATENT DOCUMENTS

| | | |
|---|---|---|
| 7,891,636 B2 | 2/2011 | Zhang |
| 9,238,309 B2 | 1/2016 | King |

(Continued)

OTHER PUBLICATIONS

International Search Report and Written Opinion, dated Apr. 9, 2020, Korean IP Office, corresponding PCT/US2019/060374.

*Primary Examiner* — Matthew J Daniels
*Assistant Examiner* — Gregory C. Grosso
(74) *Attorney, Agent, or Firm* — Adam K. Sacharoff; Much Shelist, P.C.

(57) ABSTRACT

Surface micro-texturing has been proven an effective way to reduce friction and wear for tribological applications. There is provided a low cost hot sintering method to apply micro-texturing on an advanced bearing polymer material. First, one face of the mold was micro-textured using a micro-casting method. Second, the cured Aromatic Thermosetting coPolyester (ATSP) powder was filled in the mold. Next, the filled mold was placed in a hot press for a hot sintering process. Finally, the textured bulk ATSP was cooled. The micro-textured ATSP bulk material was machined and compared with plain untextured material. The micro-textured material could effectively reduce friction at speeds lower than 2.46 m/s: 14% reduction in average.

4 Claims, 6 Drawing Sheets

(51) Int. Cl.
  *B29C 39/38* (2006.01)
  *B29C 39/00* (2006.01)
  *C08K 3/11* (2018.01)
  *B29C 59/02* (2006.01)
  *B29K 67/00* (2006.01)
  *B29K 79/00* (2006.01)

(52) U.S. Cl.
  CPC .... *B29K 2067/00* (2013.01); *B29K 2079/085* (2013.01); *C08K 2201/011* (2013.01)

(56) References Cited

U.S. PATENT DOCUMENTS

| | | |
|---|---|---|
| 9,268,215 B2 | 2/2016 | Nielsen et al. |
| 2008/0103228 A1 | 5/2008 | Falcone et al. |
| 2011/0085932 A1* | 4/2011 | Pandey ................ B22F 5/106 420/552 |
| 2011/0272896 A1* | 11/2011 | Kamibayashiyama .................. F16J 15/3284 277/650 |
| 2012/0126458 A1 | 5/2012 | King |
| 2014/0238255 A1 | 8/2014 | Sugasaki |
| 2015/0284586 A1* | 10/2015 | Economy ............ C08G 63/133 427/485 |
| 2017/0044361 A1 | 2/2017 | Duquenne et al. |
| 2017/0051099 A1 | 2/2017 | DiCiccio et al. |
| 2017/0165899 A1 | 6/2017 | Murray |
| 2018/0251406 A1* | 9/2018 | Sun ...................... C04B 35/505 |

\* cited by examiner

Micro-structured silicon wafer (dimples)

Micro-structured silicone (pillars)

Micro-structured rubber (dimples)

Micro-structured ceramic (pillars)

Micro-structured brass (dimples)

Micro-structured metal (pillars)

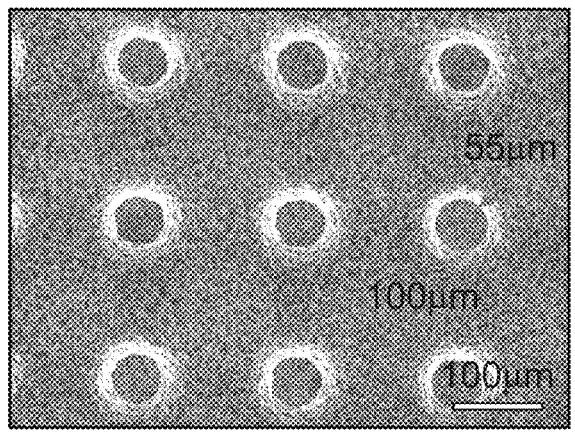
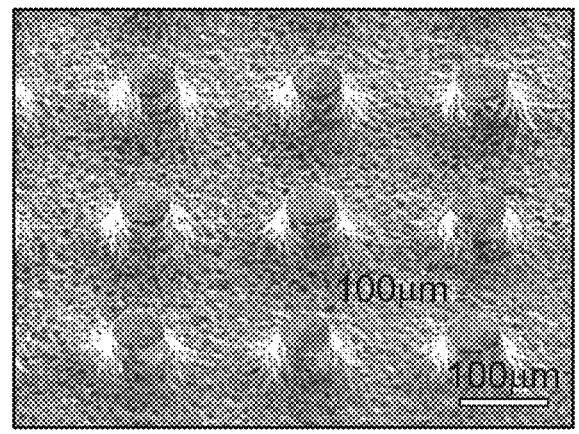
FIG. 2A          FIG. 2B
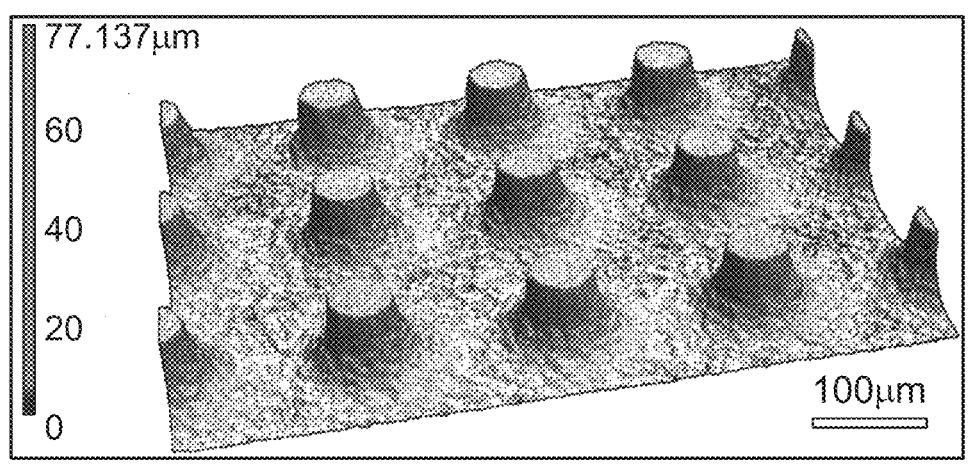
FIG. 2C

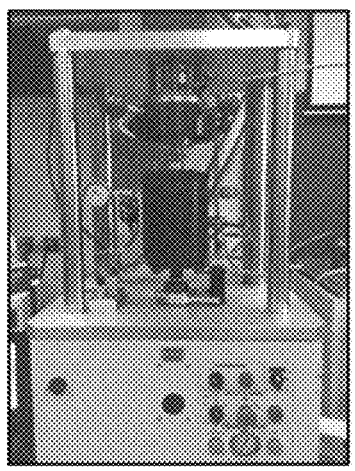 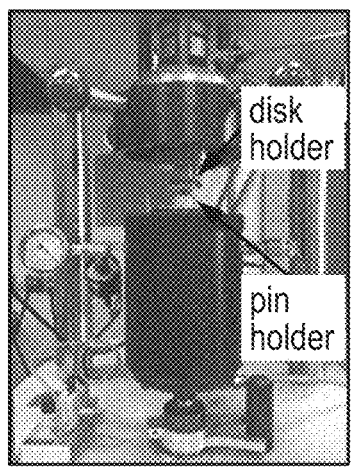 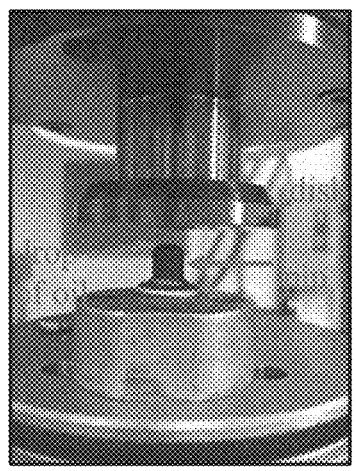
FIG. 5A    FIG. 5B    FIG. 5C
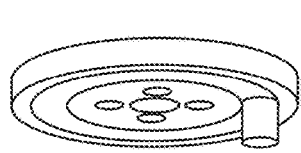
FIG. 5D
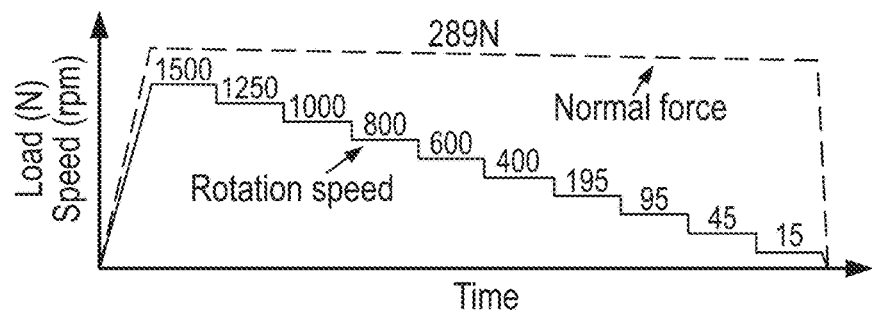
FIG. 5E
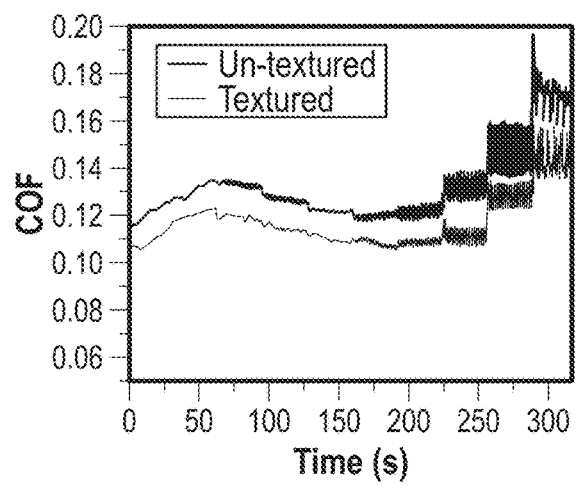 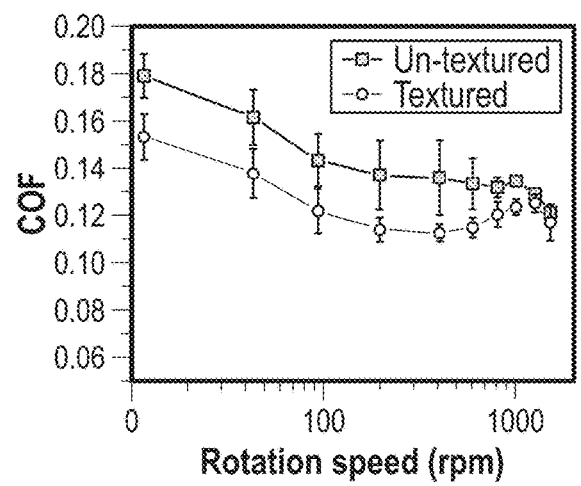
FIG. 6A    FIG. 6B

US 11,254,032 B2

SURFACE TEXTURING FOR ADVANCED POLYMERS

CROSS REFERENCE TO RELATED APPLICATIONS

The present application claims priority to U.S. Provisional Application Ser. No. 62/757,256 filed Nov. 8, 2019, which is incorporated herein by reference in its entirety.

BACKGROUND OF THE INVENTION

The application of a specific pattern on a surface is called surface texturing, and when the surface possesses a pattern on the micro scale, this is called a micro-textured surface. Surface micro-texturing can improve surface properties, such as hydrophobicity, anti-reflectivity, hardness and fluid mechanics performance. It has also been widely accepted that micro-textured surfaces can improve tribological performance. When texturing is applied in hydrodynamic plain bearings, micro-textured surfaces have shown to effectively improve the film thickness and load capacity, and they can also reduce the coefficient of friction (COF) and pad temperature. For hard disk dry air hydrodynamic sliding applications, micro-textured surfaces reduce the interfacial adhesion force, stabilize the air-bearing, and minimize the wear on the polymeric lubricant. For boundary lubricated conditions, the micro-dimples on the textured surface work as lubricant reservoirs and can continuously supply lubricant including in lubricant-starved conditions. For dry sliding conditions, previous studies revealed the critical influence of amplitude and direction of texture on the fretting wear rate, wear volume, friction torque and accumulated dissipated energy. Micro-texturing can also trap wear debris and alleviate third-body abrasive wear thereby reducing friction and wear.

Regarding micro-texturing techniques for tribological applications, there are two main concerns: one is the design of dimensions/parameters of the micro-texture patterns and the other is the fabrication of the texturing patterns on the surface. With circular and square shaped textures, micro-dimples have been the most widely used geometry, for which, the parameters to be optimized are diameter, width, depth, distance between dimples, density of textured area, and the bottom shape of the dimples. Such a wide range of parameters results in a large number of different micro-texture combinations. Thanks to Navier-Stokes equations and advances in modern computational capabilities, an effective geometry can be arrived at by solving the equations using fluid simulations. However, due to their geometrical complexity and small scale, manufacturing of micro-textured surfaces is not as easy as their design.

Micro-texture fabrication methods include photolithography and chemical etching, mechanical machining, abrasive blasting, electrochemical micromachining, micro casting, injection and compression molding, embossing, and laser ablation. Among these methods, each has advantages and disadvantages. Photolithography and chemical etching are convenient and commonly used in the semiconductor industry, however, the materials are typically hard and brittle, which is not well-suited for engineering bearing applications. Mechanical machining, abrasive blasting, electrochemical micromachining and embossing are useful for metal surface machining, however, due to tool wear and time-consuming processes, these methods are relatively expensive. Injection and compression molding are fast and inexpensive methods to produce micro-textured products, but it is only applicable for thermoplastic polymers with excellent melt rheology. For high performance advanced engineering thermoset polymers and relatively intractable thermoplastic polymers, such as polyimides, the injection molding method is not practical. Laser ablation has advantages such as easy control of shape, size and distribution of the textured surface, rapid fabrication and being compatible with many different materials. However, for laser ablation, the mechanical/metallurgical properties of the substrate could be affected by the laser beam heat. Also, laser ablation can leave surface defects such as high roughness, bulges or burrs, which may require expensive lapping or polishing for post treatments.

In addition to surface texturing design and manufacturing, for tribological applications under harsh operating conditions such as starved and boundary lubrication conditions, the tribological properties of the material itself are also important. Specifically, the material should exhibit low COF and good wear resistance, thus ensuring that the geometry of the micro-textures prevails, including under operation in the boundary lubrication regime. The polymer material referred to as Aromatic ThermoSetting coPolyester (ATSP) is an advanced engineering polymer that was invented in the mid-1990s; ATSP and its composites have shown excellent tribological performance, including immeasurable wear at temperatures ranging from −160° C. to 260° C. under dry sliding conditions, extremely low wear rate ($4.15 \times 10^{-8}$ mm$^3$/Nm) under starved lubrication conditions, stable COF and low wear rate under sand abrasive conditions, low friction and low wear in air-conditioning compressor environments, and extreme low COF for oil and gas drilling applications. For the concept of combining micro-texturing with an advanced bearing polymer, we introduce a hot sintering method to produce the micro-textured pins from ATSP powder. The consolidation of the ATSP powder into a fully dense part and ability to assume the texture was enabled by plasticity mediated by bond exchange reactions. A term within literature to describe crosslinked, network polymers possessing exchangeable covalent bonds is 'vitrimers'. The exchangeable bonds in the case of the ATSP resin systems are the ester linkages between aromatic components. Tribological experiments were then carried out for the micro-textured and untextured pins using a pin-on-disk experimental configuration under boundary lubrication conditions.

SUMMARY OF THE INVENTION

Surface micro-texturing has been proven an effective way to reduce friction and wear for tribological applications. Currently, it is proposed a low cost hot sintering method to apply micro-texturing on an advanced bearing polymer material. In step 1 of this method, one face of the mold was micro-textured using a micro-casting method. In step 2, the cured Aromatic Thermosetting coPolyester (ATSP) powder was filled in the mold. In step 3, the filled mold was placed in a hot press for a two-hour hot sintering process, and in step 4, the final textured bulk ATSP was completed after cooling down. Subsequently, the micro-textured ATSP bulk material was machined to 6.35 mm diameter pins for pin-on-disk configuration tribological studies at different speeds with a contact pressure of 9.1 MPa, under boundary lubrication conditions. Compared with plain untextured flat pins, the micro-textured pins could effectively reduce friction at speeds lower than 2.46 m/s: 14% reduction in average. Scanning electron microscopy was utilized for morphological studies of the micro-textured mold, and micro-textured ATSP samples, before and after the tribological experiments.

BRIEF DESCRIPTION OF THE FIGURES

A fuller understanding of the foregoing may be had by reference to the accompanying drawings, wherein:

FIGS. 2a-2c show the micro-textured pillars of the A2 tool steel, illustrating (2a) SEM normal direction view, (2b) SEM 40° side directional view, and (2c) laser microscopic 3D image;

FIGS. 5a-5e show experimental tribometer setup, illustrated as (5a) tribometer with open chamber, (5b) test chamber with pin and disk holders, (5c) boundary lubricated interface using 50 mg (one drop) of ISO 46 oil on the pin, (5d) pin-on-disk experimental configuration, (5e) speed effect experimental protocol;

FIGS. 6a-6b show tribological results, (6a) In-situ COF vs. Time, (6b) Average COF vs. speed.

DESCRIPTION OF THE INVENTION

The materials for surface texturing in the current technique include polymer materials that are suitable for sintering such as ATSP, Polyimide, Polybenzimidazole, Polyamide, etc.; and also, the materials can be ceramic or metal powder for sintering. The materials can be processed in powder format or consolidated, thick section format.

Example 1, Aromatic Thermosetting Copolyesters (ATSP)

Following prior-developed methods, matched cross-linkable aromatic polyester oligomers were synthesized via a batch oligomerization process in two matched batches in a 2 L reactor with peak temperature of 270° C. under flowing argon. The carboxylic acid end-capped oligomer and acetoxy end-capped oligomer were produced using trimesic acid (TMA), isophthalic acid (IPA), 4-acetoxybenzoic acid (ABA), and biphenol diacetate (BPDA) with molar ratio of 1:2:3:2 and 1:0:3:3. The reaction proceeded until viscous melts were produced and the acetic acid by-product distilled out neared the theoretical yield. The theoretical molecular weight for these oligomers is 1203.09 g/mol and 1201.16 respectively. Viscous melts were cooled to room temperature and transformed to a brittle solid. Oligomers were ground to a powder using a laboratory grinder and passed through a <90 μm mesh screen driven by a Retsch vibratory shaker sieve.

Cured ATSP powders were produced by first reacting the carboxylic acid end-capped oligomer and acetoxy end-capped oligomer oligomers so as to produce a fully cross-linked network polymer possessing exchangeable bonds. The carboxylic acid end-capped oligomer and acetoxy end-capped oligomer were mixed at a 1:1 weight ratio and cured via an imposed thermal cycle of 200° C. for 1 h, 270° C. for 2 h followed by 330° C. for 3 h under vacuum. This produces a foam material with a typical density of 0.36-0.53 g/cm$^3$. ATSP foamed structures were then ground to produce powders which pass through a <90 μm mesh in a manner similar to the solids above, though substantially more grinding time was necessary due to the high mechanical properties of the ATSP resin.

Fabrication of Texturing Mold Surface

To produce the micro-textured samples from ATSP powder, a hot sintering mold with a micro-textured surface was produced. The micro-textured surface was manufactured on A2 tool steel by EDM Department Inc. USA. The texture was in the form of a micro pillar array, which was placed on a square grid pattern with the following dimensions: diameter of the pillars' bottom and top is 100 μm and 55 μm, respectively; the height of the pillars is 65 μm; and the pitch (center spacing) is 182 μm. The manufacturing of the micro pillar array was based on a micro casting method.

Figure 1A:
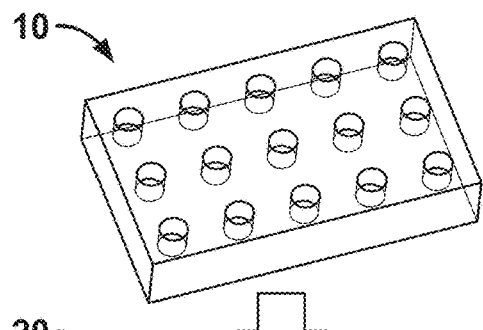
FIGS. 1a-1f show the micro-casting process illustrating (1a) a silicon wafer micro-textured dimples produced by Bosch process, (1b) silicone micro-textured pillars cast from the silicon wafer, (1c) rubber micro-textured dimples cast from the silicone, (1d) ceramic micro-textured pillars cast from the rubber, (1e) brass micro-textured dimples cast from ceramic and work as EDM electrode, and (1f) A2 tool steel micro-textured pillars from EDM machining.
Figure 1B:
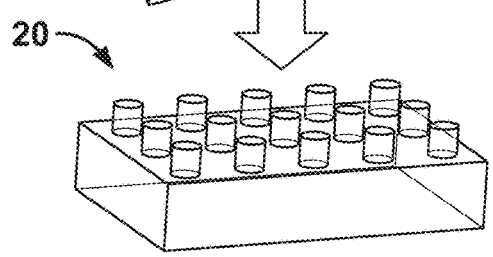
Figure 1C:
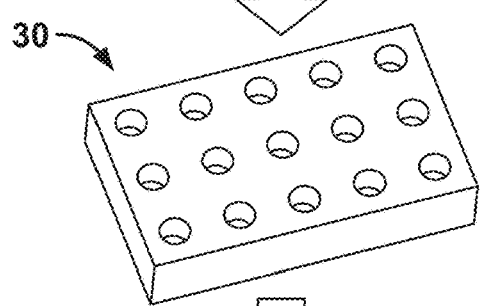
Figure 1D:
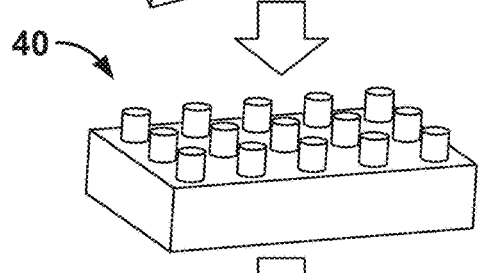
Figure 1E:
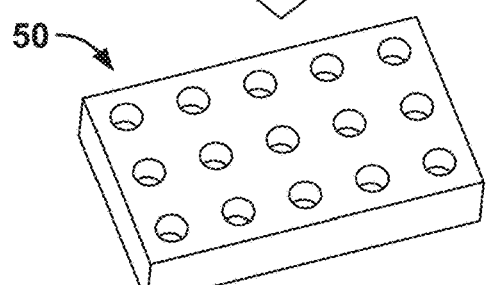
Figure 1F:
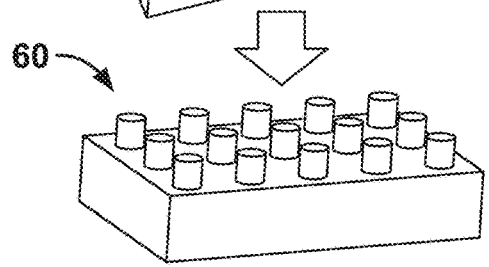

FIG. 1 shows the micro casting process that starts from a micro-textured silicon wafer porotype 10 (FIG. 1(a)) to the final micro-textured metal 60, FIG. 1(f). The micro-dimple structure on the silicon wafer 10 was produced by Bosch process etching method, which is based on alternating multiple steps of etching and sidewall passivation. Then, polydimethylsiloxane (PDMS) silicone with micro-pillars 20, FIG. 1(b), was vacuum cast from a silicon wafer porotype. The silicone mold was then used for vacuum casting of rubber with micro-dimple structures, as in FIG. 1(c). The uncured rubber was cured within the silicon mold in a 40° C. oven for 2.5 h. The rubber mold 30 with the micro-dimples was used for ceramic casting, which resulted in a micro-pillar structured ceramic 40, FIG. 1(d). The ceramic was produced from water-based plaster with fine particles, smaller than the micro features. After casting, the ceramic was settled at room temperature for 45 min and then cured at 150° C. for 12 h. In the next step, the ceramic mold with micro-pillars was used for casting a low melting point metal (brass) 50, which was used as an electrical discharge machining (EDM) electrode as shown in FIG. 1(e). In the last step, A2 tool steel with the micro-pillar array on the surface was produced 60 by EDM, as shown in FIG. 1(f). This micro-casting method has two main advantages: First, from one micro fabricated silicon wafer 10, about 150 metal molds 60 with micro-textured surfaces can be produced. Second, with the help of flexible rubber, curved complex surfaces with micro-textures can also be produced.

The final product of A2 tool steel 60 with the micro-textured pillars is shown in the Scanning Electron Microscopy (SEM) images in FIGS. 2(a) and 2(b) (JEOL 6060LV). In addition, FIG. 2(c) shows a 3D micro-image of the micro-textured pillars, which was taken by a Keyence vk-x1000 laser microscope. The micro pillars have bottom and top diameters of 100 μm and 55 μm respectively. This cone shape arrangement is to help release the final micro-textured dimples of the ATSP polymer product.

Production of Micro-Textured Bulk Advanced Polymer

Figure 3A:
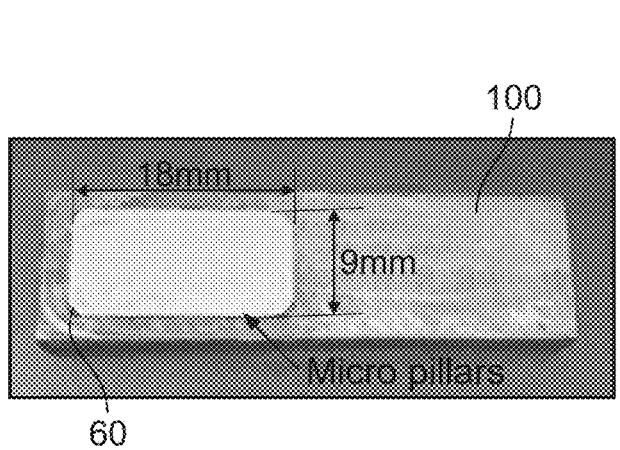
FIGS. 3a-3c show an ATSP bulk polymer micro-textured sample production, illustrated as (3a) bottom mold piece with micro-pillars on the surface, (3b) cured ATSP powder, (3c) 3D schematic of the mold components, (3d) ATSP bulk sample with micro-textured dimples on the surface.
Figure 3B:
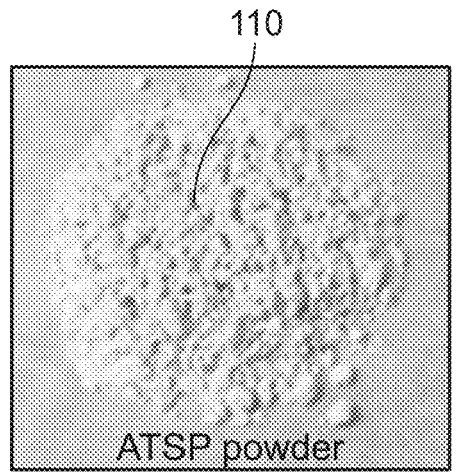
Figure 3C:
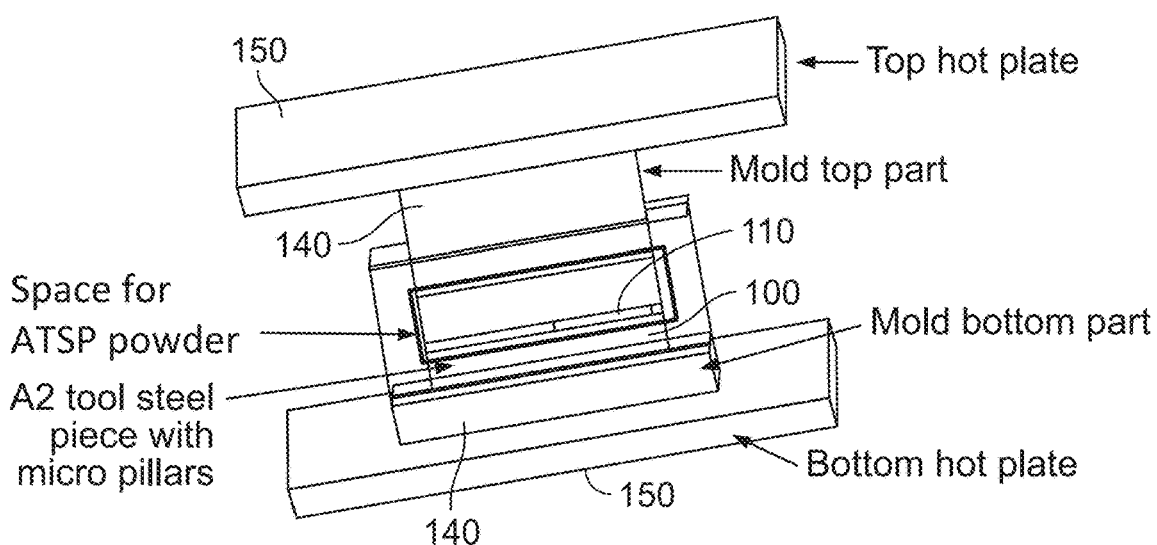
Figure 3D:
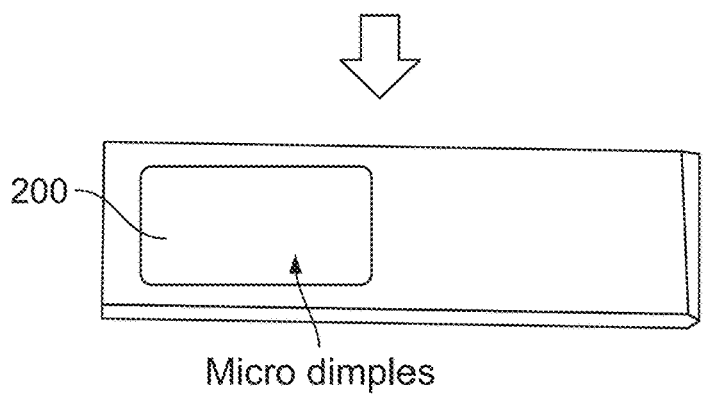

The micro-textured pillars on the A2 tool steel 60 with rectangular dimension of 9 mm×18 mm was mounted on a larger rectangular A2 tool steel block 100 (12 mm×45 mm), as shown in FIG. 3(a). The rectangular block 100 was placed at the bottom of the mold with the micro-textured pillar surface facing up, as shown in FIG. 3(c). Cured ATSP powder 110, shown in FIG. 3(b), was then loaded into the mold on top of the micro-textured pillar surface. The loaded mold was compressed with 13.8 MPa normal pressure in a vacuumed hot press with heating elements 150 installed on the top and the bottom press plates 140. The temperature increased to 340° C. and held for 2 hours for hot sintering of the ATSP powder to a bulk sample 200, FIG. 3(d). ATSP is a thermoset polymer and cured ATSP powder does not melt at elevated temperatures. The sintering of ATSP is partly based on a solid state bond exchange reaction called interchain transesterification (ITR), which enables the surfaces of the particles in contact to form a contiguous chemical network and be consolidated to a bulk sample at high temperature and high pressure conditions. The mold can be used almost indefinitely (long life), as long as it is well protected and maintained. In addition, the micro-textured surface is produced during the process of making the ATSP bulk material. Thus, the hot sintering of this micro-textured ATSP is a low cost production method as this introduces no additional production steps other than the initial production of the mold itself.

Figure 4A:
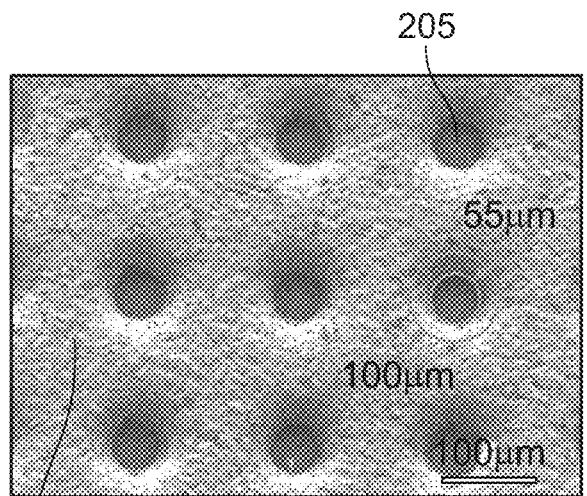
FIGS. 4a-4c show SEM images of the micro-textured dimples on bulk ATSP sample: (4a) normal view, (4b) 40° side view. (4c) laser microscopic 3D image.
Figure 4B:
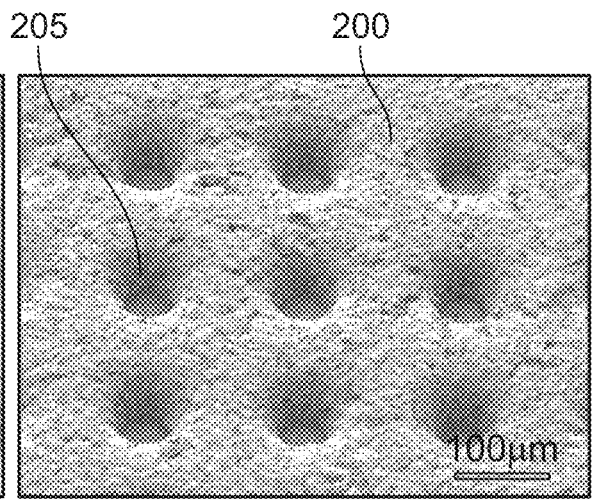
Figure 4C:
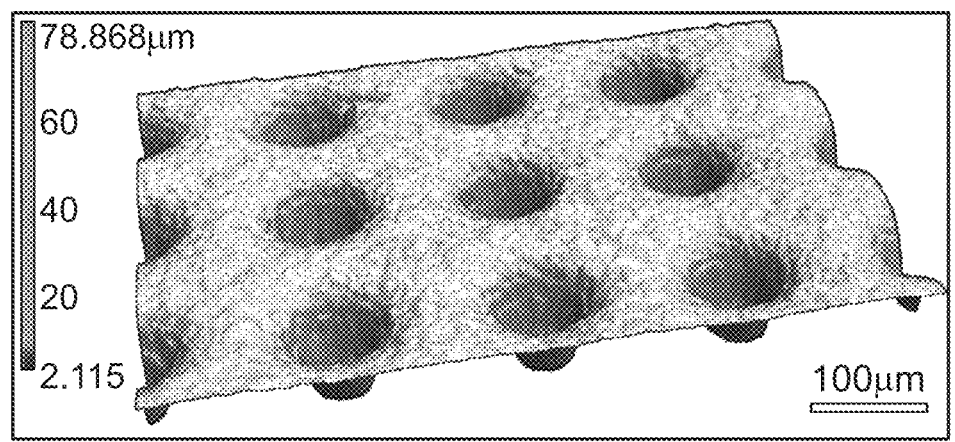
Figure 7A:
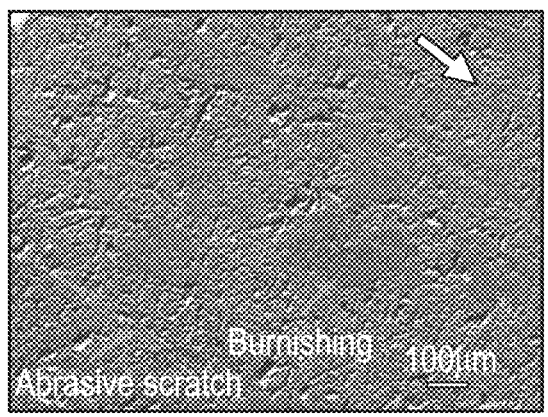
FIGS. 7a-7d show the SEM images of the untextured and textured pins after tribological experiments with wear tracks: 100× magnification of (7a) untextured, (7b) textured pins (normal view). 200× magnification of textured pin (7c) normal view, (7d) 40 degree side view.
Figure 7B:
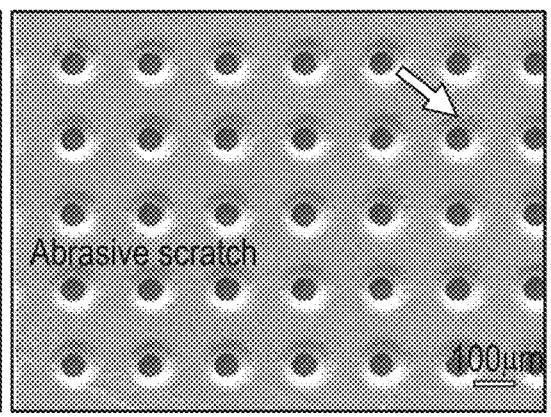
Figure 7C:
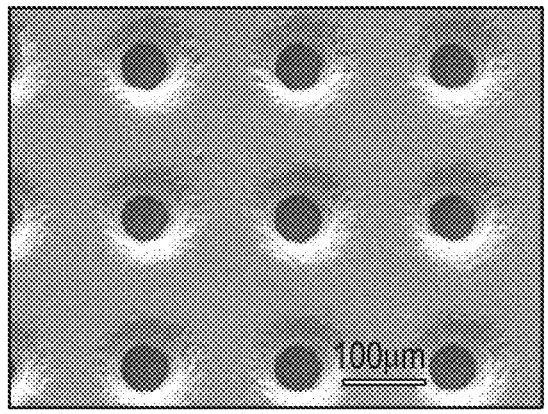
Figure 7D:
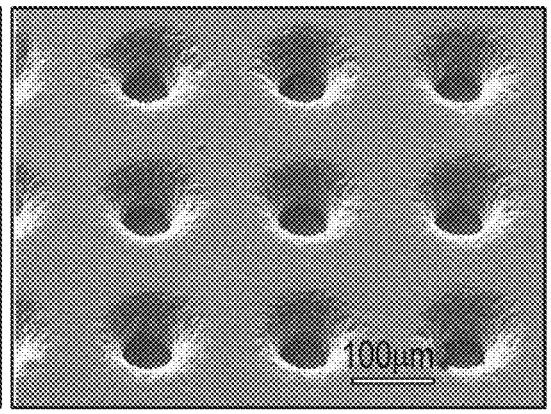

SEM images of the ATSP product 200 with surface micro-textured dimples 205 are shown in FIGS. 4(a) and (b). FIG. 4(c) shows a 3D microscopic image of the micro-textured dimples. Comparing FIG. 2 (mold) and FIG. 4 (produced polymer sample), the ATSP bulk sample copied the micro-texture and the surface topography of the A2 tool steel very well. As shown in Table 1, the Surface profile parameters of micro-textured mold and produced ATSP bulk:

TABLE 1

| Surface | Roughness (μm) | Maximum height (μm) | Skewness (μm) | Core void volume (ml/m$^2$) |
|---|---|---|---|---|
| Mold (inverted) | 20.49 | 81.34 | −2.08 | 5.83 |
| ATSP bulk | 19.72 | 80.93 | −2.14 | 5.64 | four different surface parameters are listed for showing the transferability of the texture from the mold to the ATSP sample. The 3D digital data used for this calculation covered an area of 36 pillars/dimples (the pillars on the mold were inverted to dimples for better comparison). In the table, surface roughness is the root-mean-square of surface height, and maximum height is the difference from peak-to-valley in the sampling area. The listed values are the average of 10 separate dimples/pillars and surrounding areas. Surface skewness shows the asymmetry of height distribution (for a symmetric surface, the skewness is zero, if the surface has deep valleys, it has a negative skewness and this is the case for micro-dimples textures. Core void volume is the surface area that encloses from 10% to 80% of the surface bearing area and provides the capability of lubricant fluid retention for the surface.

The values of the four parameters are very similar for the mold and ATSP bulk surface, thus this hot sintering method can transfer the texture from the mold to the produced ATSP sample very well. Note, that the value of surface roughness and core void volume are both slightly higher for the mold, compared with ATSP bulk (by 3.7% and 3.21% respectively), and this is due to the shrinkage of the fully cured ATSP polymer when it cools down from the high molding temperature due to the difference in the coefficient of thermal expansion between A2 tool steel and the ATSP polymer ($14.4 \times 10^{-6}$ K$^{-1}$ and 40×1V respectively). After sintering, the ATSP bulk sample was machined into two types of 6.35 mm diameter cylindrical pins, namely micro-textured dimple pins and flat surface pins, to be used for the pin-on-disk tribological experiments.

Tribological Testing

To evaluate the tribological performance of the micro-textured pins and the plain flat pins, a specialized tribometer was employed, and depicted in FIG. 5(a). The tribometer is capable of generating rotational speeds up to 2000 rev/min, and it can apply and maintain a normal load up to 445 N. In addition, the in-situ normal and friction forces are recorded and used to calculate the in-situ COF. The open test chamber with the disk and pin holders assembled in place, are shown in FIGS. 5(b) and (c). To ensure a nominally flat contact between the pin and the disk, a self-aligning pin holder was designed and utilized as shown in FIG. 5(c). Boundary lubrication conditions were desired for this study, obtained by using 50 mg of ISO 46 hydraulic oil on top of the pin before it came into contact with the disk (see FIG. 5(c)). A pin-on-disk configuration was utilized to simulate the sliding motion between tribopairs, as shown in FIG. 5(d). The disk is made of SAE O1 tool steel, and it has a diameter of 50.8 mm, a thickness of 5.1 mm and a root-mean-square roughness of 0.15 μm. Before each experiment, the pins and disks were cleaned thoroughly in a bath of isopropanol to remove possible contamination from the surfaces. The samples were then dried with a hot air blower.

In the present study, full speed effects on the COF of the textured and untextured pins were obtained using the test protocol shown in FIG. 5(e). For each tribopair, the test protocol was carried out three times with new samples to ensure repeatability. A normal load of 289 N (9.1 MPa nominal contact pressure) was applied on the pin through a short (10 s) ramp up function and kept constant during the experiment. The rotational speed was initially set to ramp up to 1500 rpm (i.e., 3.69 m/s), and reduced stepwise to 1250, 1000, 800, 600, 400, 200, 100, 95, 45, 15 rpm. The duration for each single rotational speed experiment was 30 s, which was sufficient to develop steady-state friction behavior. Once the experiment was completed, the pin and disk were visually checked. In all tested scenarios the sliding track of the pin on the disk was covered with a thin film of oil, thus it was confirmed that the lubricant was not spun out and diminished due to high centrifugal movement during experiments. The pins and disks were ultrasonically cleaned in a bath of isopropanol and air dried for subsequent surface characterization.

Tribological Results

FIG. 6(a) shows the representative in-situ COF vs. time for each type of pin, while FIG. 6(b) depicts the average COF values for each pin type at the tested velocities. One could observe that the micro-textured pins resulted in the reduction of the COF, as well as stabilizing the contact interface dynamics. The standard deviation of the COF values is calculated and used to denote the error bars on the COF data points for each condition. While the contact was never run dry, the magnitude of the oscillation increases as the velocity decreased to lower values. Micro-texturing the surface not only resulted in reduction of the COF values for all tested velocities, but also reduced the fluctuations in the COF. Referring to FIG. 6(b), micro-texturing exhibits higher efficiency in reducing the friction at lower rotational velocities. As the velocity increases to 1000 rpm (2.46 m/s) the effectiveness diminishes.

On average, micro-texturing showed a 14% COF reduction at speeds lower than 1000 rpm. This behavior could be explained by the fact that at lower velocities, lubrication remains in the boundary regime, thus the effect of surface topography is highlighted. Micro-texturing provides a surface topography with small lubricant reservoir pockets (dimples) which could enhance lubrication by providing more lubricant at this regime, when compared to plain flat surfaces. In addition, they render the surface to a hybrid topography where at the locations of the dimples, the contact remains fully lubricated regardless of the sliding velocity. Both these factors contribute to lower COF of the micro-textured pins. The same arguments hold for the mixed lubrication regime and mid velocity range. However, at higher velocities a fully developed thin lubrication film is expected to emerge on the surface of the flat pin as well as the surface of the micro-textured pin. Under this scenario, micro-texturing could not enhance the lubrication regime. Hence, we measured similar COF values at high velocities, as in FIG. 6(b).

SEM of Samples after Tribological Tests

SEM images of the untextured and textured pins after the experiments were obtained and shown in FIG. 7. The objective of these images was to observe any potential wear damage on the surface texturing. FIGS. 7(a) and (b) provides SEM of the untextured and textured pin after tests, respectively. Both pins depict some minor abrasive wear scratches on the surface due to the asperities on the steel counter-surface. For the untextured pins, there was clear evidence of burnishing occurring in the wear track. For the textured pins, the burnishing is much lower and difficult to clearly measure. As shown in FIGS. 7(c) and (d) with higher magnification in the wear track of the textured pins, even though the textured pins experience high frictional heating due to the high contact pressure (9.1 MPa) and high sliding speed (3.69 m/s), both normal and side views show that there was no tangible plastic deformation or geometry change of the dimples. Mild polishing of the surface resulted in smoother topography in the areas between the dimples. This geometry stabilizing feature is extremely important for applying micro-texturing on polymer surfaces for high-pressure and high-speed tribological applications. If the micro-texturing on the polymer surfaces wears out or easily deforms, the texturing effect would diminish. Because of its high temperature and high wear resistance properties, ATSP is an excellent candidate for micro-texturing for tribological applications under severe operating conditions.

Figure 8:
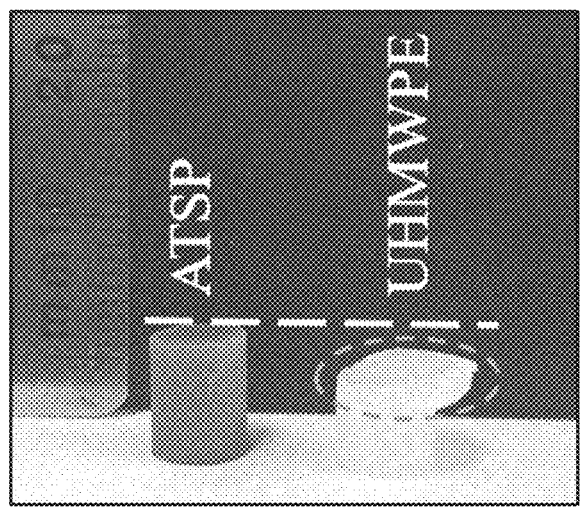
FIG. 8 shows the side view of ATSP and UHMWPE pins tested under identical conditions. Sliding direction from left to right.

To demonstrate the remarkable performance of ATSP, pins made of ultra high molecular weight polyethylene (UHMWPE) with similar geometry and texture as the ATSP pins were tested under identical testing conditions. The texture on UHMWPE was produced by hot stamping of a bulk piece at 130° C. using the same textured mold as in FIG. 2. The mechanical properties and the tribological performance of the textured UHMWPE were studied under moderate testing conditions. FIG. 8 depicts a side view of the ATSP and UHMWPE pins after testing. In the current study, due to high contact pressure and frictional heat generated at the contact, the UHMWPE pin was softened and completely deformed within 3 min after the test started, as indicated by the dashed red circle, whereas ATSP maintained its geometrical form.

Additional polymers amenable to the powder sintering process include aromatic polyimides such as those derived from pyromellitic dianhydride and oxydianiline. Additional polymers amenable to the hot stamping process include the aromatic poly ether ether ketone derived from hydroquinone and 4,4'-difluorobenzophenone.

In this work, a micro-texturing technique was developed and successfully applied on the surface of an advance bearing polymer material. The technique is based on hot sintering with the micro-textured mold produced using a micro-casting technique. SEM and laser microscopic analyses of the textured polymer surfaces demonstrated that the final micro-dimples on the ATSP surface have good replication of the micro-pillars of the steel mold. Limited tribological experiments at different velocities under boundary lubricated conditions showed that the micro-textured pins reduce the COF by 14%, compared to untextured pins (at speeds lower than 2.46 m/s). SEM analysis after tribotesting showed that the advanced bearing material could retain the geometry of the micro-textured surface even in the boundary lubrication regime, under high contact pressure and high sliding speed. These tribological results showed the attractiveness of the cost-effective hot sintering method for micro-texturing manufacturing, which opens up the micro-texturing technique for high performance advance engineering polymers, such as ATSP and polyimide.

In one embodiment of the present invention there is provided a method for producing micro-textured surfaces on high performance engineering polymers. The method is defined under the following steps: (a) preparing a powder of a fully cured network polymer, the polymer being configured to posses exchangeable covalent bonds within a cross-linked resin, defined as a vitrimer; (b) loading the fully cured network polymer possessing exchangeable covalent bonds into a metallic mold, wherein the mold has a surface micro-texturing that is a negative of the desired surface micro-texturing on at least one face of the mold (the negative being defined as a micro-texturing pillars extending away from the face); and (c) applying a heat and pressure cycle such that the fully cured network polymer consolidates as enabled by plasticity mediated by bond exchange reactions and the polymer surfaces in contact with the negative of the micro-textured mold creates the desired micro-texturing surface of the network polymer (which may be micro-textured dimples corresponding to the pillars on the mold).

As further defined by the method, the vitrimer is an aromatic thermosetting copolyester resin synthesized by a reaction of constituent crosslinkable aromatic copolyester oligomers with carboxylic acid end-caps or acetoxy end-caps at a ratio of 1:1, which were cured via an imposed thermal cycle of 200° C. for 1 hour, 270° C. for 2 hours followed by 330° C. for 3 hours under vacuum and reduced in particle size and sieved to <90 μm average particle diameter, and wherein the oligomers being produced using trimesic acid (TMA), isophthalic acid (IPA), 4-acetoxybenzoic acid (ABA), and biphenol diacetate (BPDA) at a molar ratio of 1:2:3:2 and 1:0:3:3 for the carboxylic acid-capped oligomer and the acetoxy-capped oligomer.

In another aspect of the method, the aromatic thermosetting copolyester powder was loaded into a mold having a negative of a micro-textured pillar surface, and the loaded mold is compressed with 13.8 MPa normal pressure in a vacuumed hot press with heating elements installed on the top and the bottom press plates, and wherein the temperature is increased 340° C. and held for 5 minutes to 2 hours for consolidation of the ATSP powder to a bulk sample with at least one surface in contact with the mold walls to create a micro-textured dimpled surface corresponding to micro-textured pillared surface.

In another aspect of the method, the refractory structural or tribological additives are included with the vitrimer. This aspect of refractory structural or tribological additives may include one or more of the following: (a) carbon black nanofiller having an average particle of 10-30 nm or 50-100 nm; (b) carbon nanotubes having an average outside diameter of 10-30 nm and an inside diameter of 5-10 nm and a length of 10-30 µm; (c) graphene nanoplatelets having a flake diameter of 5-25 µm and a thickness of 5-8 nm; (d) milled carbon fibers with an outside diameter of 4-8 µm and a length of 50-200 µm; (e) graphite powder with average particle size of 0.5-50 µm; (f) molybdenum disulfide powder with average particle size of 0.5-10 µm; and (g) polytetrafluoroethylene powder with average particles sizes of 1-45 µm.

In another embodiment of the present invention, there may be provided a method for producing micro-textured surfaces on high performance engineering polymers. The method includes (a) preparing a powder of an intractable thermoplastic engineering polymer; (b) loading the intractable thermoplastic engineering polymer powder into a metallic mold, wherein the mold has a negative of a desired micro-texturing surface on at least one face of the mold; and (c) applying a heat and pressure cycle such that the intractable thermoplastic polymer consolidates as enabled by plasticity above a glass transition temperature of the polymer surfaces in contact with the micro-textured surface of the mold, thereby creating the desired micro-texturing surface on the polymer surface.

In aspect of this method, the intractable thermoplastic engineering polymer powder is an aromatic polyimide derived from pyromellitic dianhydride and oxydianiline having an average particle size <120 µm. The aromatic polyimide powder may be loaded into a mold featuring a micro-textured pillared surface, and wherein the powder is heated without application of pressure to 300° C. for 10 minutes, and wherein the pressure is then applied and maintained at a level of 20 MPa for 2 minutes, thereby producing a bulk specimen with at least one surface (in contact with the mold walls) possessing a micro-textured dimpled surface, and further heating the specimen in a vacuum oven at 450° C. for 5 minutes.

In another aspect of the invention, the refractory structural or tribological additives are included with the intractable thermoplastic engineering polymer powder, and wherein the refractory structural or tribological additives include one or more of the following: (a) carbon black nanofiller having an average particle of 10-30 nm or 50-100 nm; (b) carbon nanotubes having an average outside diameter of 10-30 nm and an inside diameter of 5-10 nm and a length of 10-30 µm; (c) graphene nanoplatelets having a flake diameter of 5-25 µm and a thickness of 5-8 µm; (d) milled carbon fibers with an outside diameter of 4-8 µm and a length of 50-200 µm; (e) graphite powder with average particle size of 0.5-50 µm; (f) molybdenum disulfide powder with average particle size of 0.5-10 µm; and (g) polytetrafluoroethylene powder with average particles sizes of 1-45 µm.

In another aspect of the present invention, there is provided a method for producing micro-textured surfaces on high performance engineering polymers: The method includes: (a) preparing a consolidated article of a thermoplastic engineering polymer; (b) loading the article of the thermoplastic engineering polymer powder into a metallic mold, wherein the mold has a negative of a desired surface micro-texturing on at least one face; (c) applying a heat and pressure cycle to create a thermoplastic engineering polymer with the desired surface micro-texturing imposed by the negative of the desired micro-textured surface of the mold as enabled by plasticity above a glass transition temperature of the polymer; and (d) thereby producing polymer surfaces with desired micro-texturing surface.

In aspects of the prior method, the thermoplastic engineering polymer is an aromatic poly ether ether ketone article derived from hydroquinone and 4,4'-difluorobenzophenone, and wherein the aromatic poly ether ether ketone article is loaded into a mold featuring a micro-textured pillared surface, and wherein the article is heated without application of pressure to 260° C. for 5 minutes, and wherein pressure is then applied and maintained at a level of 3.5 MPa for 2 minutes and wherein the bulk specimen with at least one surface in contact with the mold walls possesses micro-textured dimpled surface corresponding to the micro-textured pillared surface.

In addition, the thermoplastic engineering polymer is an ultra high molecular weight polyethylene (UHMWPE), and wherein the UHMWPE article is loaded into a mold featuring a micro-textured pillar surface, and wherein the article is heated without application of pressure to 140° C. for 5 minutes, and wherein pressure is then applied and maintained at a level of 3.5 MPa for 2 minutes thereby producing a bulk specimen with at least one surface possessing positive micro-textured pillars corresponding to the mold walls of the negative micro-textured pillars.

In yet other aspects, the refractory structural or tribological additives are included within the thermoplastic engineering polymer article and the refractory structural or tribological additives include one or more of the following: (a) carbon black nanofiller having an average particle of 10-30 nm or 50-100 nm; (b) carbon nanotubes having an average outside diameter of 10-30 nm and an inside diameter of 5-10 nm and a length of 10-30 µm; (c) graphene nanoplatelets having a flake diameter of 5-25 µm and a thickness of 5-8 nm; (d) milled carbon fibers with an outside diameter of 4-8 µm and a length of 50-200 µm; (e) graphite powder with average particle size of 0.5-50 µm; (f) molybdenum disulfide powder with average particle size of 0.5-10 µm; and (g) polytetrafluoroethylene powder with average particles sizes of 1-45 µm.

We claim:

1. A method for producing a micro-textured surface on high performance engineering polymers comprising:
preparing a powder of a fully cured network polymer, the polymer being configured to possess exchangeable covalent bonds within a crosslinked resin, defined as a vitrimer; and
wherein the vitrimer is an aromatic thermosetting copolyester powder, the vitrimer being synthesized by a reaction of constituent crosslinkable aromatic copolyester oligomers with carboxylic acid end-caps and acetoxy end-caps at a ratio of 1:1 weight ratio that is cured by an imposed thermal cycle of 200° C. for 1 hour, 270° C. for 2 hours followed by 330° C. for 3 hours under vacuum and reduced in particle size and sieved to <90 µm average particle diameter producing a foam material with a typical density of 0.36-0.53 g/cm$^3$ and then grounding the foam material to produce the powder of the fully cured network polymer;
loading the aromatic thermosetting copolyester powder possessing exchangeable covalent bonds into a metallic mold, wherein the mold is configured with a micro-texturing pillared surface on at least one face, and the diameter of pillars in the micro-textured pillared surface is approximately 100 μm with a height of pillars is approximately 65 μm and a pitch of approximately 182 μm; and applying a hot sintering process cycle such that the network polymer consolidates as enabled by plasticity mediated by bond exchange reactions, and wherein the step of applying the hot sintering process cycle includes: (a) compressing the mold with the loaded aromatic thermosetting copolyester powder with 13.8 MPa normal pressure, (b) vacuum hot pressing the compressed loaded aromatic thermosetting copolyester powder, (c) increasing the temperature to 340° C. and holding the temperature for 5 minutes to 2 hours for consolidation of the vitrimer to a bulk sample, and (d) removing the bulk sample from the metallic mold thereby creating at least one surface possessing a micro-textured dimpled surface on the network polymer that is formed by the micro-texturing pillared surface on the at least one face of the mold.

2. The method of claim 1, wherein the oligomers being produced using trimeric acid (TMA), isophthalic acid (IPA), 4-acetoxybenzoic acid (ABA), and biphenol diacetate (BPDA) at a molar ratio of 1:2:3:2 and 1:0:3:3 for the carboxylic acid-capped oligomer and the acetoxy-capped oligomer.

3. The method of claim 1, wherein vitrimer further includes refractory structural or tribological additives.

4. The method of claim 3, wherein the refractory structural or tribological additives include one or more of the following:
   carbon black nanofiller having an average particle of 10-30 nm or 50-100 nm;
   carbon nanotubes having an average outside diameter of 10-30 nm and an inside diameter of 5-10 nm and a length of 10-30 μm;
   graphene nanoplatelets having a flake diameter of 5-25 μm and a thickness of 5-8 nm; milled carbon fibers with an outside diameter of 4-8 μm and a length of 50-200 μm; graphite powder with average particle size of 0.5-50 μm;
   molybdenum disulfide powder with average particle size of 0.5-10 μm; and
   polytetrafluoroethylene powder with average particles sizes of 1-45 μm.

* * * * *